Oct. 4, 1932.  C. A. DE GIERS  1,881,265
LIQUID LEVEL INDICATOR
Filed July 10, 1929   2 Sheets-Sheet 1
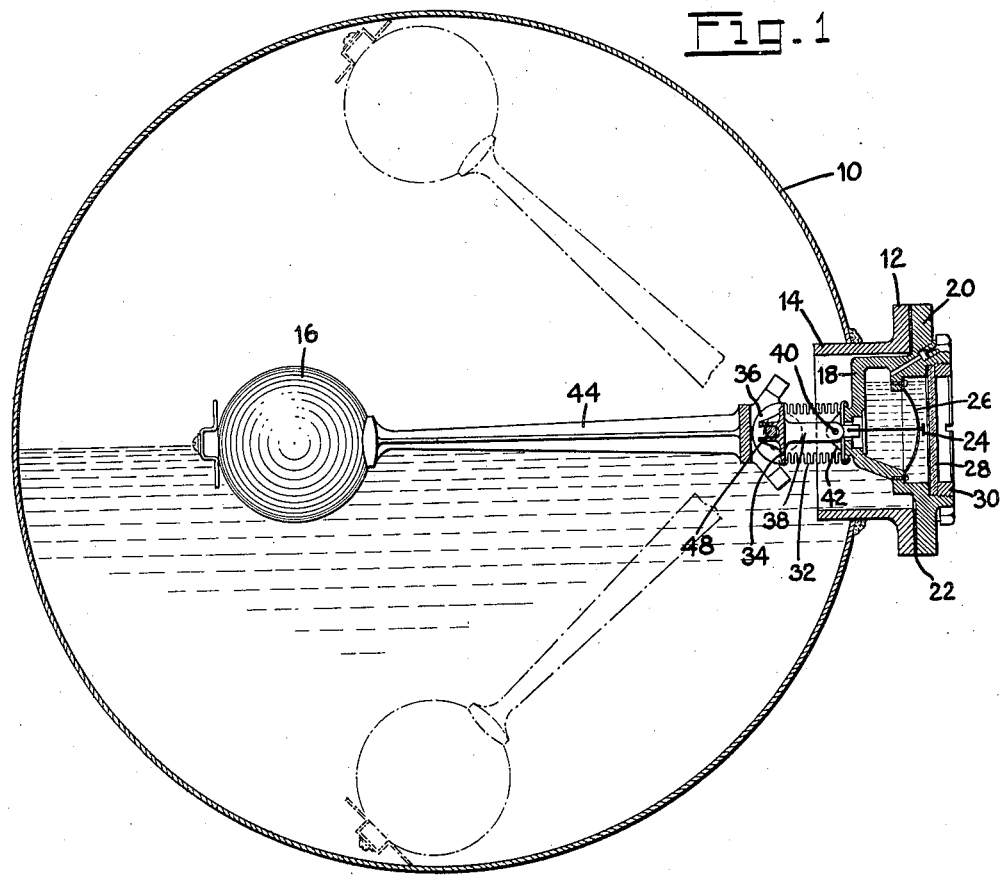
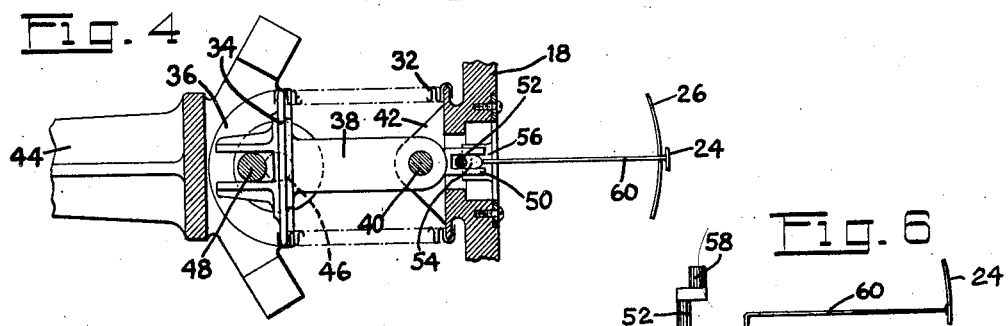
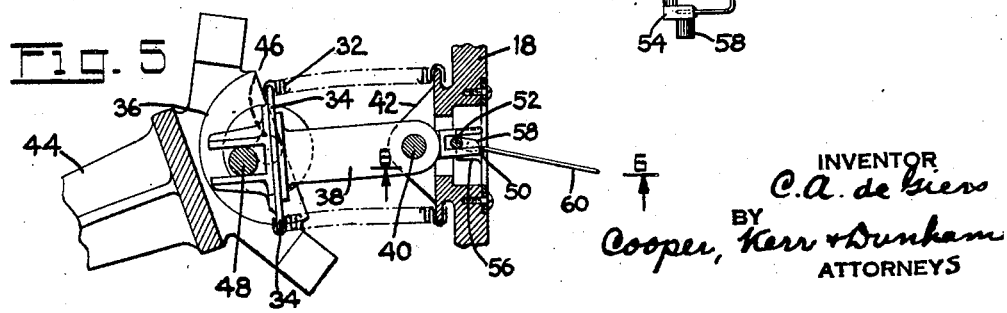
INVENTOR
C. A. de Giers
BY
Cooper, Kerr & Dunham
ATTORNEYS Oct. 4, 1932.  C. A. DE GIERS  1,881,265
LIQUID LEVEL INDICATOR
Filed July 10, 1929  2 Sheets-Sheet 2
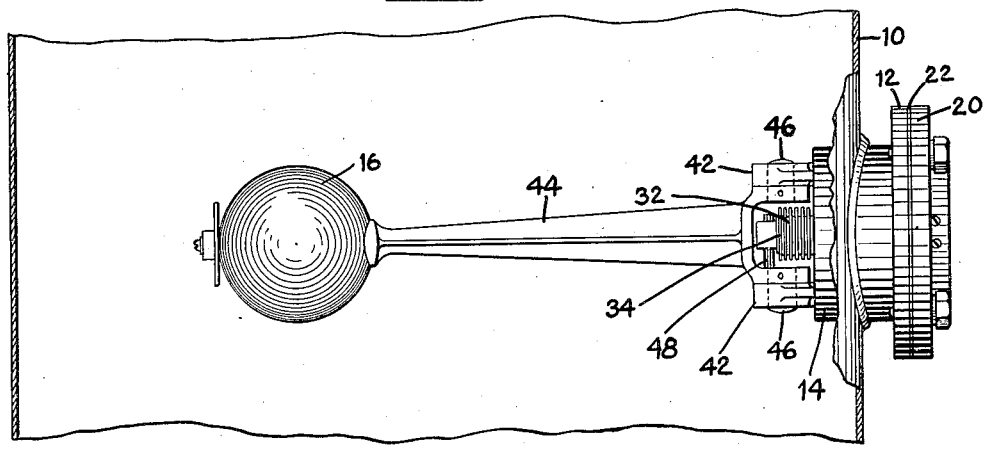
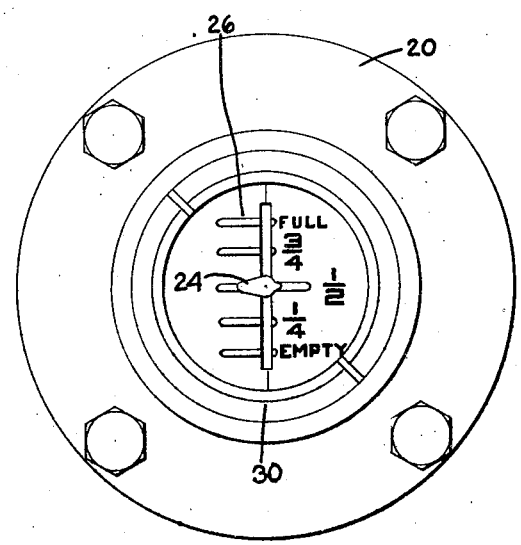

Patented Oct. 4, 1932

1,881,265

UNITED STATES PATENT OFFICE

CLARENCE A. DE GIERS, OF FOREST HILLS, NEW YORK, ASSIGNOR TO LIQUIDOMETER CORPORATION, OF LONG ISLAND CITY, NEW YORK, A CORPORATION OF DELAWARE

LIQUID LEVEL INDICATOR

Application filed July 10, 1929. Serial No. 377,087.

The present invention pertains to liquid level indicators of the type adapted for direct connection to the tank containing the liquid.

The principal object of the invention is to disclose an instrument simple in design, easy to manufacture, and unaffected in service by the character of the tank contents.

Further and other objects and advantages will be apparent from the specification and claims, and from the drawings which by way of illustration show what is now considered the preferred embodiment of the invention.

Fig. 1 shows a cross-section of the device in operative position in a tank.

Fig. 2 is a plan view of the apparatus in Fig. 1, the tank being in section.

Fig. 3 is a view of the face of the instrument, taken from the right of Fig. 1.

Fig. 4 is an enlarged cross-section showing details of the device with the parts in the position of Fig. 1, with float arm horizontal.

Fig. 5 is a view similar to Fig. 4 but with parts in the position assumed when the float is at the bottom of the tank.

Fig. 6 is an enlarged view of the pointer and crank, on the line 6—6 of Fig. 5.

The tank 10 is provided at its side with a flange 12 for supporting the instrument in operative position. A tubular extension 14 of the flange projecting into the tank is of sufficient diameter to allow passage of the float 16 therethrough for ease of installation or removal.

The indicating instrument comprises a hollow body member 18 having a flange 20 adapted to be bolted to the supporting flange 12, with packing 22 between the flanges to prevent leakage of liquid from the tank.

Within body 18 are the pointer 24 and graduated chart 26, visible through glass face 28 which seals the front of body 18, being held in position by threaded ring 30 screwed into body 18.

Attached to the rear of body 18, sealed thereto, and extending toward the center of the tank, is a sylphon 32. The outer end of the sylphon is sealed by a head 34 which is provided on its outer face with a slotted projection 36, and on its inner side with a tongue 38 extending through the sylphon toward body 18, upon which it is pivoted by a pin 40 passing through the end of tongue 38 and brackets 42 rigid on body 18.

Integral with body 18 and extending on both sides of the sylphon are brackets 42 upon which float arm 44 is pivoted by means of trunnion pins 46 fast in the bifurcated end of the arm. Between projections 36 is a pin 48, set into one side of the float arm eccentrically from the pivot line thereof so that as the float rises and falls with the change of level of the liquid, pin 48 is given an up and down motion to move head 34 and the parts attached thereto in arcuate paths about pin 40.

Extending from the free end of member 38 is a bifurcated projection 50 engaging crank pin 52 of crank shaft 54 (Fig. 6) which is supported on body 18 by flanged bracket 56 so as to be free to rotate about its journals 58 which are supported in suitable bearings in bracket 56. Fast to crank shaft 54 is a wire arm 60 upon the outer end of which is mounted pointer 24.

In practice the parts are arranged as in Fig. 4 so that when the tank is half full float arm 44, pointer arm 60, and crank pins 48 and 52 are all on a horizontal line through their centers.

With the above construction in mind it will be appreciated that when the float moves toward the bottom of the tank the parts of the instrument will assume the positions shown in Fig. 5 where arm 44 and its crank pin 48 have moved below the center line, tongue 38 and head 34 have moved downwardly about their pivot 40, while jaw 50 has moved crank pin 52 upwardly and arm 60 and pointer 24 downwardly. In similar manner when the float rises above the position of Fig 4 the operative parts will move in the reverse direction and the pointer will move to the top of the chart. Thus the pointer will move up and down in proportion to the float movement, to always indicate on the chart the amount of liquid in the tank. The sylphon, being flexible, bends to adapt itself to the movements of head 34, and at the same time serves to seal the interior of the device against contact with the liquid or gases within the tank.

The interiors of body 18 and sylphon 32 are interconnected by passage 54 and are filled with glycerine or other suitable liquid to prevent condensation of moisture on chart 26 or glass 28.

Since the thrust due to axial pressure on head 34 is absorbed by pin 40, the operation of the device is not affected by variations of pressure in the tank.

It is to be understood that the invention is not limited to the specific embodiment hereby illustrated and described but may be used in other ways without departure from its spirit as defined by the following claims.

I claim—

1. An apparatus of the class described, in combination, a float adapted for movement by change of level of liquid, an arm supporting said float and movable therewith, a pivoted member engaged by said arm and movable thereby, indicating means movable by said pivoted member whereby the amount of liquid in the tank is indicated, and a flexible sleeve for enclosing the pivoted end of said pivoted member and sealing it from the contents of the tank.

2. In a liquid level indicating apparatus adapted for mounting on a tank containing liquid, a float in said liquid, a pivoted arm carrying said float, a pivoted member, a pointer, and devices interconnecting said pivoted member with said arm and with said pointer whereby when said float is moved by the liquid, said float arm will swing said pivoted member about its pivot, and said member will cause actuation of said pointer to indicate the level of the liquid in the tank, said pivoted member being provided with a sylphon for sealing the pivoted end thereof from contact with the contents of the tank.

3. In a liquid level indicating apparatus adapted for attaching to a tank containing liquid, a body member, a movable member pivoted on said body member, means responsive to change of level of the liquid for swinging said movable member about its pivot, and a flexible sleeve interconnecting said body and said movable member whereby the pivoted portion of said member is sealed from contact with contents of the tank.

4. In a liquid level indicating apparatus adapted for attaching to a tank containing liquid, a body member, a movable member pivoted on said body member, means responsive to change of level of the liquid for swinging said movable member about its pivot, an indicator, means operatively interconnecting said movable member and said indicator, and a flexible sleeve, said sleeve and said body serving to seal said indicator and said interconnecting means from contact with the contents of the tank.

5. In a liquid level tank indicator, in combination, a body member, a member pivoted on said body member, a head on said pivoted member adapted to receive tank pressure on its outer side, means for keeping tank pressure from the inner side of said head, and means for resisting said outer pressure whereby said pressure may vary without affecting the operation of the indicator.

6. In a liquid level tank indicator, in combination, a member movable in accordance with change of liquid level in the tank, a head on said member adapted to receive tank pressure on its outer side, a sylphon for keeping tank pressure from the inner side of said head, and means for resisting said outer pressure whereby the operation of the indicator is not affected by changes of tank pressure.

7. In a liquid level indicator adapted for connection to a tank, a hollow body member, a chart in said body member, a pointer adapted to move relatively to said chart, an arm supporting said pointer, a crank shaft supporting said arm, a pivoted member adapted to rotate said shaft, a head on said pivoted member, a crank pin adapted to engage said head, and a float operatively connected to said crank pin whereby movement of said float causes said pin to move said pivoted member about its pivot, whereby said pivoted member will cause said pointer to indicate on said chart the position of said float.

In testimony whereof I hereto affix my signature.

CLARENCE A. DE GIERS.